(12) United States Patent
Fukase et al.

(10) Patent No.: US 8,488,159 B2
(45) Date of Patent: Jul. 16, 2013

(54) PRINTING SYSTEM, PRINTING METHOD, PRINTING CONTROL APPARATUS, PRINTING CONTROL METHOD, AND COMPUTER READABLE RECORDING MEDIUM STORED WITH PRINTING CONTROL PROGRAM FOR ADDING PADDING DATA TO IMAGE DATA

(75) Inventors: Tomoko Fukase, Hachioji (JP); Masatsugu Koguchi, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 895 days.

(21) Appl. No.: 12/629,402

(22) Filed: Dec. 2, 2009

(65) Prior Publication Data
US 2010/0165384 A1    Jul. 1, 2010

(30) Foreign Application Priority Data
Dec. 3, 2008    (JP) .................................. 2008-309038

(51) Int. Cl.
*G06F 3/12*    (2006.01)
*G06F 15/00*    (2006.01)
*G06K 15/00*    (2006.01)
*G06K 15/02*    (2006.01)

(52) U.S. Cl.
USPC ............ 358/1.15; 358/1.14; 358/1.9; 358/1.2

(58) Field of Classification Search
None
See application file for complete search history.

(56) References Cited

U.S. PATENT DOCUMENTS
2001/0033701 A1*   10/2001   Okisu et al. ................... 382/284
2004/0080769 A1*    4/2004   Kodama et al. ............... 358/1.13
2005/0097458 A1*    5/2005   Wilson .......................... 715/517

FOREIGN PATENT DOCUMENTS
JP    2007-304788 A    11/2007

\* cited by examiner

*Primary Examiner* — Thomas Lett
(74) *Attorney, Agent, or Firm* — Buchanan Ingersoll & Rooney PC

(57) ABSTRACT

The printing system comprises: a print data generating unit for generating print data; an image data generating unit for generating image data for each page having a data size of an integral multiple of a specified block size based on the print data; a delivering unit for delivering the image data; an imposing unit for imposing the image data in such a way that images for a plurality of pages will be printed on a sheet of paper; and a printing unit for printing images for a plurality of pages on a sheet of paper, wherein a process for preventing a blank space being formed in a boundary area between the images to be printed on a sheet of paper due to padding data added to the image data in order to make data size of the image data to be an integral multiple of the block size, is executed.

19 Claims, 16 Drawing Sheets

(A)

(B)

| Layout | booklet, 2in1, no-line binding, split booklet, double side, single side, ... |
|---|---|
| Book-binding orientation | left binding, right binding, top binding |
| Imposition mode | fast, refined |
| Gutter/creep | Yes, No, mm designation, dot designation, inch designation, ... |
| Folding | Yes, No |
| Stapling | Yes, No, center, left, right, ... |
| Paper size | A3, B4, ISO B4, Letter, Tabloid, ... |

(A)

(B)

(C)

(A)

| Address | Memory space |
|---|---|
| 1 | 100 |
| 2 | 100 |
| 3 | 100 |
| ⋮ | ⋮ |
| 349 | 100 |
| 350 | 100 |
| 351 | 0 |
| 352 | 0 |
| 353 | 0 |
| 354 | 0 |
| 355 | 0 |
| ⋮ | ⋮ |
| 382 | 0 |
| 383 | 0 |
| 384 | 0 |

(B)

| Address | Memory space |
|---|---|
| 1' | 0 |
| 2' | 0 |
| 3' | 0 |
| ⋮ | ⋮ |
| 31' | 0 |
| 32' | 0 |
| 33' | 100 |
| 34' | 100 |
| 35' | 100 |
| 36' | 100 |
| 37' | 100 |
| ⋮ | ⋮ |
| 382' | 100 |
| 383' | 100 |
| 384' | 100 |

(A)

○ Size which is an integral multiple of the block (x,y)

□ Size which is not an integral multiple of the block (X,Y,x_p,y_p)

● Position which is an integral multiple of the block
(Position obtained by advancing one block from (0,0), ($X_{HW}, Y_{HW}$))

(B)

(A)

(B)

(C)

PRINTING SYSTEM, PRINTING METHOD, PRINTING CONTROL APPARATUS, PRINTING CONTROL METHOD, AND COMPUTER READABLE RECORDING MEDIUM STORED WITH PRINTING CONTROL PROGRAM FOR ADDING PADDING DATA TO IMAGE DATA

CROSS-REFERENCE TO RELATED APPLICATION

This application is based on Japanese Patent Application No. 2008-309038 filed on Dec. 3, 2008, the contents of which are incorporated herein by reference.

BACKGROUND

1. Technical Field

The present invention relates to a printing system, a printing method, a printing control apparatus, a printing control method, and a computer readable recording medium stored with a printing control program. The present invention particularly relates to a printing system, a printing method, a printing control apparatus, a printing control method, and a computer readable recording medium stored with a printing control program for executing a process of imposing image data by means of dedicated hardware.

2. Description of Related Art

Image data for each page of printed matters such as books is imposed, for example, in such a manner that images for two pages are printed on one side of a sheet of paper so that they are presented in a proper page order when the sheet of paper is folded.

As to the technology related to the imposition process, printing control apparatus such as the one disclosed by Unexamined Japanese Patent Publication No. 2007-304788 are known. The printing control apparatus disclosed by Unexamined Japanese Patent Publication No. 2007-304788 receives print data transmitted from a client PC to generate image data per page and executes the imposition process. The imposition process can be executed by means of a dedicated hardware circuit.

However, since data is processed in increments of data of a specific block size (e.g., 8×8 dots) in a hardware circuit, the data size of the image data imposed by the hardware circuit is limited. If the data size of the image data of the document portion of each page generated based on the print data is not an integral multiple of said block size, supplementary data (hereinafter referred to as "padding data") is added to the image data in order to make the data size of the image date to be imposed an integral multiple of said block size.

Therefore, the imposition process of image data according to the hardware circuit has a problem that the padding data can be positioned in the data area of the image data corresponding to the boundary area of the images for two pages to be printed on a sheet of paper, when the data size of the image data of the document portion is not an integral multiple of said block size. The padding data that exists in the data area that corresponds to the boundary area of the image causes the blank space between the images for two pages to be printed on a sheet of paper to be larger than its preset value. In particular, if the blank space between the two images to be printed on a sheet of paper is set as "No blank space" in the printing setting, the padding data that exists in the data area corresponding to the boundary area of the image causes a linear blank space on the seam between the images. This blank space formed on the seam between the images may make the printed matter look poorer in quality in case the two images make one image that extends over two pages.

If the imposition process is executed by means of software, such problems do not occur as it becomes possible to handle data in increments of one dot. However, a problem of executing the imposition process by software is that its processing speed is slower than in the case of executing the imposition process by means of a hardware circuit.

SUMMARY

The present invention is intended to solve the abovementioned problem. The object of the present invention is to provide a printing system, a printing method, a printing control apparatus, a printing control method, and a computer readable recording medium stored with a printing control program capable of forming a blank space between images for a plurality of pages to be printed on a sheet of paper as specified in an imposition process for image data with a limited data size.

To achieve at least one of the above mentioned objects, a printing system reflecting one aspect of the present invention comprises: a print data generating unit for generating print data including drawing information of a document to be printed; an image data generating unit for generating image data for each page having a data size of an integral multiple of a specified block size based on the print data; a delivering unit for delivering the image data generated by the image data generating unit; an imposing unit for imposing the image data delivered by the delivering unit in such a way that images for a plurality of pages of the document to be printed will be printed on a sheet of paper; and a printing unit for printing images for a plurality of pages on a sheet of paper based on the image data imposed by the imposing unit, wherein a process for preventing a blank space from being formed in a boundary area between the images for a plurality of pages to be printed on a sheet of paper due to padding data added to the image data in order to make data size of the image data to be an integral multiple of the block size, is executed in the print data generating unit, the image data generating unit, or the delivering unit.

It is preferable that the abovementioned printing system further comprises a calculating unit for calculating the boundary area of the image based on the print data, wherein the image data generating unit generates the image data with the padding data added in a data area corresponding to an edge opposite to the boundary area of the image based on the drawing information; and the imposing unit imposes the image data with the padding data added in the data area corresponding to the edge opposite to the boundary area of the image.

It is preferable that the abovementioned printing system further comprises a calculating unit for calculating the boundary area of the image based on the print data, wherein the image data generating unit generates the image data with the padding data added in a data area corresponding to a predetermined edge of the image; and the delivering unit relocates the padding data into a data area corresponding to an edge opposite to the boundary area of the image by changing timing for delivering the image data; and the imposing unit imposes the image data after the padding data has been relocated into the data area corresponding to the edge opposite to the boundary area of the image.

It is preferable in the abovementioned printing system that the image data generating unit cuts out the image data having a data size of an integral multiple of the block size from a document image data generated based on the drawing information, if an image for one page included in the document to be printed is larger than a corresponding area of the sheet of paper; and the imposing unit imposes the image data cut out into the data size of the integral multiple of the block size.

It is preferable in the abovementioned printing system that the print data generating unit generates the print data, so that the drawing information is changed based on a binding position of the document to be printed and a page number of the image in such a way that a position of the padding data in the image data generated by the image data generating unit corresponds to an edge opposite to the boundary area of the image; and the image data generating unit generates the image data with the padding data added in a data area corresponding to the edge opposite to the boundary area of the image based on the print data for which the drawing information has been changed.

The objects, features, and characteristics of this invention other than those set forth above will become apparent from the description given herein below with reference to preferred embodiments illustrated in the accompanying drawings.

DETAILED DESCRIPTION

The embodiment of this invention will be described below with reference to the accompanying drawings.

Figure 1:
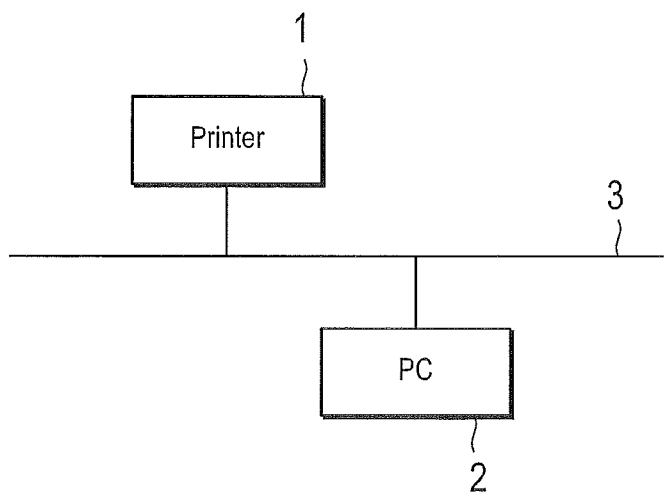
FIG. 1 is a block diagram showing the overall constitution of a printing system.

FIG. 1 is a block diagram showing the overall constitution of a printing system according to an embodiment of the present invention.

As shown in FIG. 1, the printing system according to the present embodiment has a printer 1 and a client PC 2. The printer 1 and the client PC 2 are communicably connected with each other via a network 3.

The network 3 consists of various networks such as a LAN connecting computers and network equipment according to standards such as Ethernet, Token Ring, and FDDI, or a WAN that consists of several LANs connected by a dedicated line. The types and the number of equipment to be connected to the network 3 are not limited to those shown in FIG. 1.

Figure 2:
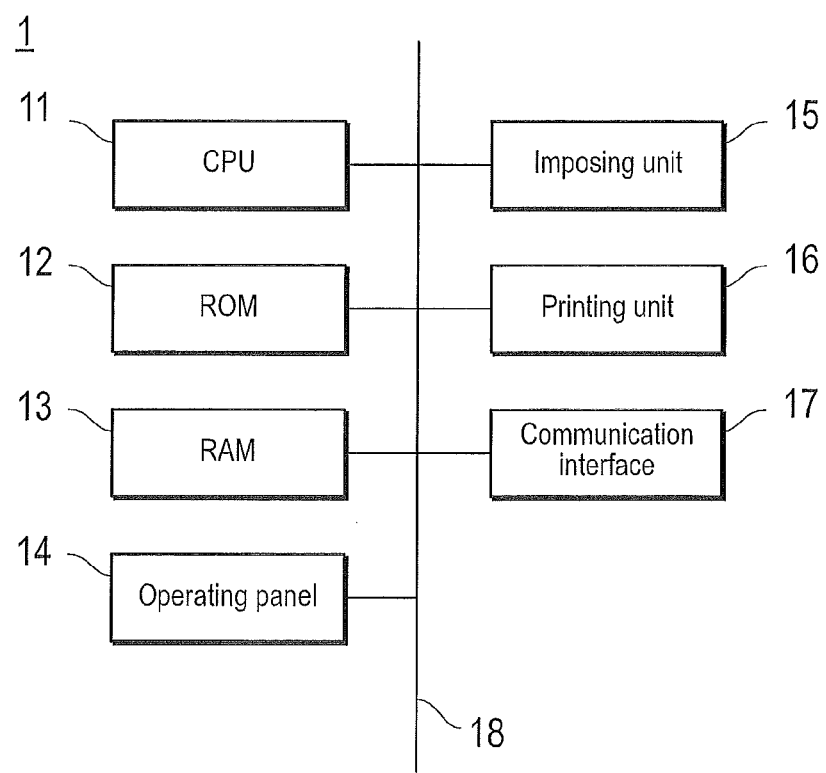
FIG. 2 is a block diagram showing the constitution of the printer shown in FIG. 1.

FIG. 2 is a block diagram showing the constitution of the printer shown in FIG. 1. The printer 1 has a CPU 11, a ROM 12, a RAM 13, an operating panel 14, an imposing unit 15, a printing unit 16, and a communication interface 17, all of which are interconnected with each other via a bus 18 for exchanging signals.

The CPU 11 controls various parts indicated above and executes various arithmetic processes according to a program. The ROM 12 stores various programs and data. The RAM 13 stores programs and data temporarily as a working area.

The operating panel 14 is equipped with a touch panel, a ten-key pad, a start button, a stop button and others to be used for displaying various data and entering various instructions.

The imposing unit 15 consists of a dedicated hardware circuit, and imposes image data appropriately in such a way as to print images for a plurality of pages of a document to be printed on a sheet of paper. The imposing unit 15 imposes, for example, two image data in such a way as to have images for two pages to be printed on a sheet of paper. The hardware circuit which constitutes the imposing unit 15 processes the image data in increments of the data of a specified block size (e.g., 8×8 dots).

The printing unit 16 prints images based on various data on a recording medium such as paper using a known image forming process such as an electronic photography type process. The printing unit 16 prints the images for a plurality of pages of the document to be printed on a sheet of paper based on the image data of a plurality of pages which has been imposed (hereinafter referred to as "printing image data"). The printing unit 16 is further equipped with a finishing unit (not shown) that provides post-processing to sheets of paper after printing. The post-processing includes processes such as a folding process for folding the sheets of paper and a stapling process for stapling the sheets of paper.

The communication interface 17 is an interface for communications with other equipments such as the client PC 2 via the network 3, for which various local connection interfaces, e.g., network interfaces such as Ethernet, Token Ring, and FDDI standards, serial interfaces such as USB and IEEE 1394, parallel interfaces such as SCSI, IEEE 1284, and wireless communication interfaces such as Bluetooth (registered trademark), IEEE 802.11, HomeRF, IrDA, as well as telephone circuit interfaces for connection to telephone circuits can be used.

Figure 3:
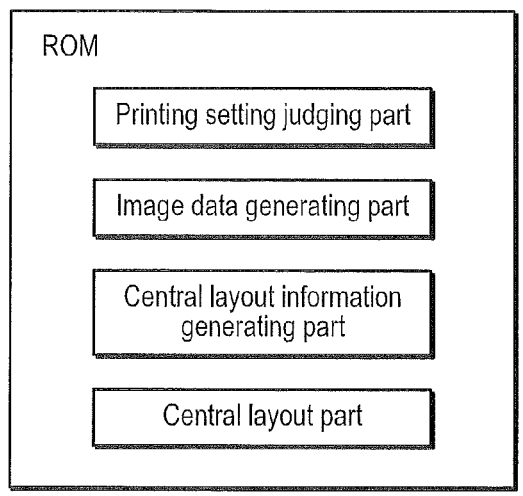
FIG. 3 is a block diagram showing the contents of the ROM of the printer shown in FIG. 1.

FIG. 3 is a block diagram showing the contents of the ROM of the printer shown in FIG. 1.

As shown in FIG. 3, the ROM 12 of the printer 1 has areas for storing the programs that correspond to a printing setting judging part, an image data generating part, a central layout information generating part, and a central layout part. The printing setting judging part analyzes the printing setting information identified by the page and the job unit from the print data, and specifies the data processing method thereafter. The image data generating part generates image data for each page based on the drawing information of the print data. In other words, the image data generating part applies a RIP process on the PDL data included in the print data to convert it into image data of a bitmap format that the printer 1 uses in printing. The central layout information generating part calculates the shift amount of the printing image data from the center of a sheet of paper. The central layout part adjusts dot by dot the position of the printing image data in accordance with the shift amount calculated by the central layout information generating part. The functions of the printing setting judging part, the image data generating part, the central layout information generating part, and the central layout part are implemented as the CPU 11 executes their respective programs.

Figure 4:
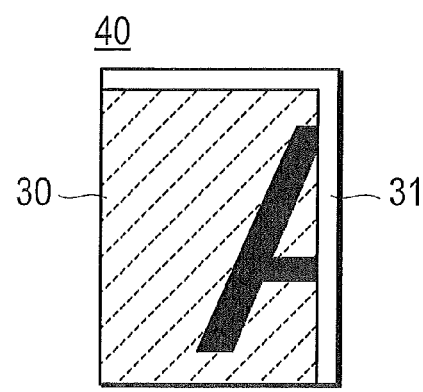
FIG. 4 is a diagram for describing the image data generated by the printer shown in FIG. 1.
Figure 4:
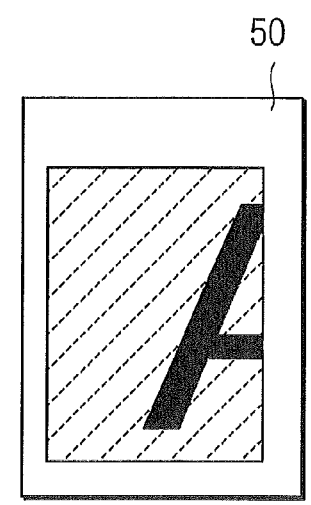

FIG. 4 is a diagram for describing the image data generated by the printer shown in FIG. 1. FIG. 4(A) is a diagram showing the image data with the padding data, and FIG. 4(B) is a diagram showing an image printed on a sheet of paper based on the image data.

As mentioned above, the printer 1 executes the imposition process by means of the dedicated hardware circuit. The data block size that can be processed is predetermined for the hardware circuit. Therefore, if the image data of the document portion 30 (hatched area of FIG. 4), which will be generated by the drawing information of the print data, is not an integral multiple of the block size of the data that can be processed by the hardware circuit, the padding data 31 is added to the image data 40 so that the data size of the image data 40 becomes an integral multiple of said block size.

For example, if the block size of the data that can be processed by the hardware circuit is 8×8 dots and the data size of the image data of the document portion 30 is 14×22 dots, the padding data 31 having a 2 dot size width is added to the end of the image data 40 so that the image data 40 having a data size of 16×24 dots, which is an integral multiple of said block size. The padding data 31 is set up to the color information that makes the image colorless when it is printed on a sheet of paper 50. The position where the padding data 31 is added in the image data 40 is predetermined in the present embodiment, and the padding data 31 is added to a position in the image data 40 that corresponds to the predetermined edge of the image (top edge and right edge of the image in FIG. 4).

Figures 5, 6:
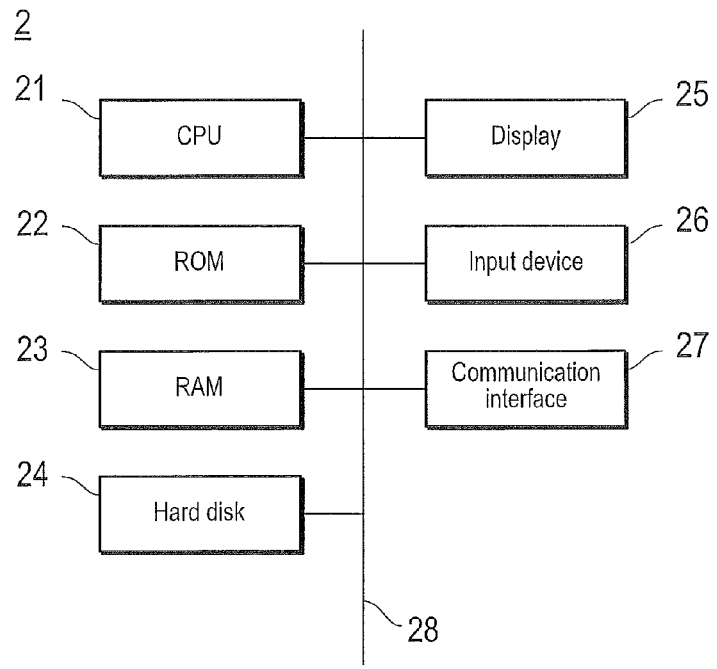
FIG. 5 is a block diagram showing the constitution of the client PC shown in FIG. 1.
FIG. 6 is a diagram showing a list of the printing setting of a printer designated by the client PC shown in FIG. 1.

FIG. 5 is a block diagram showing the constitution of the client PC shown in FIG. 1. The client PC 2 has a CPU 21, a ROM 22, a RAM 23, a hard disk 24, a display 25, an input device 26, and a communication interface 27, all of which are interconnected by a bus 28 for exchanging signals. The descriptions of those parts of the client PC 2 that have the same functions as those of the corresponding parts of the printer 1 will be omitted here to avoid being duplicative.

The hard disk 24 stores various programs including an operating system and data. A document file generation application for generating document files and a printer driver for generating print data by converting the document files into PDL data described in a page description language (PDL) are installed on the hard disk 24.

The display 25 is typically a CRT or a LCD and displays various kinds of information. The input device 26 consists of pointing devices such as a mouse, a keyboard, and others, and is used for making various kinds of inputs.

FIG. 6 is a diagram showing a list of the printing setting of a printer designated by the client PC shown in FIG. 1.

As shown in FIG. 6, the printing setting of the printer 1 set up by the client PC 2 includes "Layout," "Book-binding orientation," "Imposition mode," "Gutter/creep," "Folding," "Stapling," and "Paper size." "Layout" is a setting concerning the layout of printed matter in which images for two pages are printed on a sheet of paper by rearranging the page order as in the booklet format. "Book-binding orientation" is a setting for the page opening orientation after book-binding, and "Imposition mode" is a setting as to whether or not to adjust the position of the image data of the document portion (effective data) prior to executing the imposition process. "Gutter/creep" is a setting as to whether or not the center blank space is provided, and also as to the size of the center blank space. "Folding" is a setting as to whether or not to fold sheets of paper in the printer 1, and "Stapling" is a setting as to whether or not to staple sheets of paper in the printer 1 as well as to the stapling position. "Paper size" is a setting concerning the size of a sheet of paper on which images are printed. These printing settings are set up by the user using the client PC 2 and transmitted from the client PC 2 to the printer 1 as the printing setting information which is included in the print data.

The printer 1 and the client PC 2 can each contain constituents other than those described above, or may lack a portion of the abovementioned constituents. Moreover, different from the present embodiment, it can also be configured in such a way that the printer having the printing function and the printer controller that controls the printer are connected to the network 3 independently.

A printing system configured according to the present embodiment executes the imposition process of image data by means of a hardware circuit that handles the data in increments of data of a specific block size. In this case, the position of the padding data added to the image data is changed for each page in order to prevent a blank space from being formed in the boundary area between the images for a plurality of pages printed on a sheet of paper due to the padding data. The printing control process of the printer 1 of the present embodiment is described below with reference to FIGS. 7 through 21.

Figure 7:
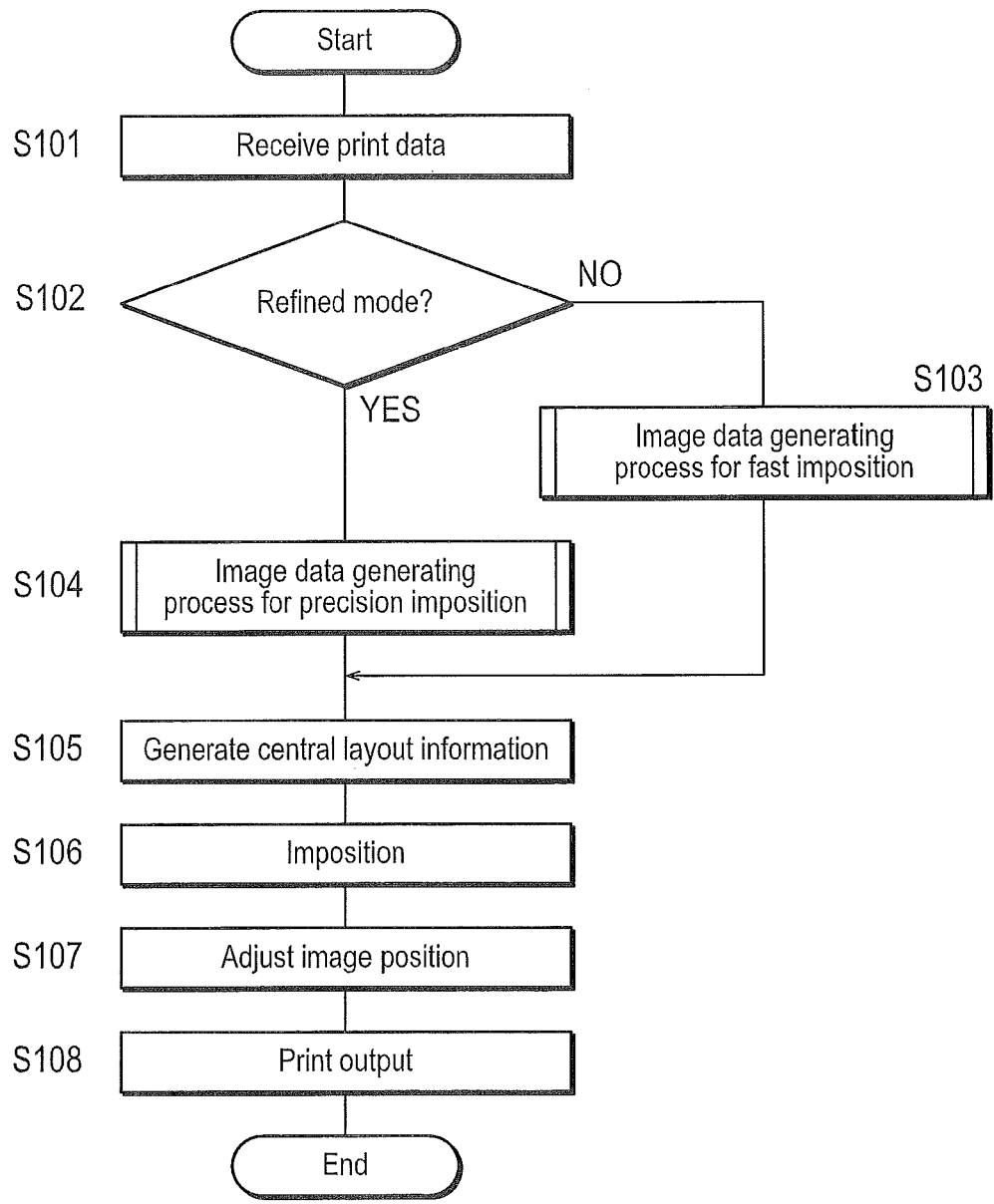
FIG. 7 is a flowchart for describing the basic flow of the printing control process of the printer shown in FIG. 1.

FIG. 7 is a flowchart for describing the basic flow of the printing control process of the printer shown in FIG. 1. The process of creating a booklet from print data of a document to be printed consisting of a plurality of pages (e.g., consisting of eight pages) will be described below for the present embodiment. The algorithm shown in the flowcharts of FIG. 7 is stored as a program in a memory unit such as a ROM 12 of the printer 1 and executed by the CPU 11.

In the printing control process of the present embodiment, first, the print data is received (step S101). In the present embodiment, the print data transmitted from the client PC 2 is received. The print data includes drawing information for pages and printing setting information. The size of images for one page included in the drawing information is, for example, A4 size, and the images of A4 size for two pages are printed on a A3 size sheet of paper and the sheet of paper is bound in the center to become the booklet of A4 size.

Next, a judgment is made as to whether the setting for the imposition process is the refined mode or not (step S102). In the present embodiment, whether the imposition mode is the refined mode or the fast mode is judged based on the printing setting information included in the print data received in the process shown in step S101.

If the setting for the imposition process is not the refined mode (step S102: No), it is concluded that the setting is the fast mode, and the image data generating process for fast imposition is executed (step S103). In the present embodiment, the image data of a bitmap format with padding data added to a predetermined position is generated based on the drawing information of the print data received in the process shown in step S101. When the image data with padding data added to a predetermined position is imposed, a blank space may be formed, for example, in the boundary area of the images for two pages printed on a sheet of paper due to the padding data. The details of the image data generating process for fast imposition shown in step S103 will be described later.

On the other hand, if the setting for the imposition process is the refined mode (step S102: Yes), the image data generating process for precision imposition is executed (step S104). In the present embodiment, first, the image data with padding data added to a predetermined position is generated based on the drawing information of the print data received in the process shown in step S101. Then, the position of the padding data in the image data is changed based on the page information of the document to be printed including the page number of the image and the binding position of the sheet of paper. More specifically, the position of the padding data is changed in such a way as to cause the blank space due to the padding data to be formed on the edge opposite to the boundary area of the images for two pages to be printed on a sheet of paper. When the image data in which the position of the padding data has been changed is imposed, no blank space is formed due to the padding data, for example, in the boundary area of the images for two pages printed on a sheet of paper. The details of the image data generating process for precision imposition shown in step S104 will be described later.

Next, the central layout information is generated (step S105). Since the block size of the data that can be processed by the hardware circuit is predetermined in case of the imposition process by the hardware circuit, the overall position of the images for two pages may shift from the center of the sheet of paper, for example, in case the images for two pages are printed on a sheet of paper. In the present embodiment, the shift amount of the printing image data from the center of the sheet of paper is calculated.

Next, the imposition process by means of the hardware circuit is executed (step S106). In the present embodiment, the image data for each page generated in the process shown in the step S103 or the step S104 is imposed properly in such a way that the page order will be correct when the sheet of paper is folded. As a consequence, for example, the printing image data of a bitmap format consisting of image data for two pages is generated.

Next, the position of the printing image data is adjusted (step S107). In the present embodiment, the position of the printing image data generated in the process shown in step S106 is adjusted dot by dot in such a way that the images for two pages comes to be located as a whole in the center of a sheet of paper based on the central layout information calculated in the process shown in step S105. The details of the central layout information generating process and the image position adjusting process shown respectively in steps S105 and S107 will be described later.

Then, images for a plurality of pages are printed on a sheet of paper based on the printing image data (step S108), and the process is terminated. In the present embodiment, for example, the images for two pages are printed on one side of a sheet of paper based on the printing image data whose position is adjusted in the process shown in step S107. A center blank space can be formed between the images for two pages printed on a sheet of paper based on the printing setting information concerning the center blank space included in the print data. In order to simplify the explanation, the description hereinafter will be limited to a case where the printing setting for the center blank space between the images for two pages is "No center blank space."

As mentioned in the above, according to the process of the flowchart shown in FIG. 7, first, either the image data with the padding data added to a predetermined position, or the imaged data after the position of the padding data has been changed, is generated in accordance with the printing setting information included in the print data. Moreover, the image data for each page is imposed by a dedicated hardware circuit to generate printing image data and, for example, the images for two pages are printed on a sheet of paper. When the image data with the padding data added to the predetermined position is imposed, a blank space is formed in the boundary area of the images for two pages printed on a sheet of paper due to the padding data. On the other hand, in case when the image data after the position of the padding data has been changed is imposed, no blank space due to the padding data is formed in the boundary area of the image.

Figure 8:
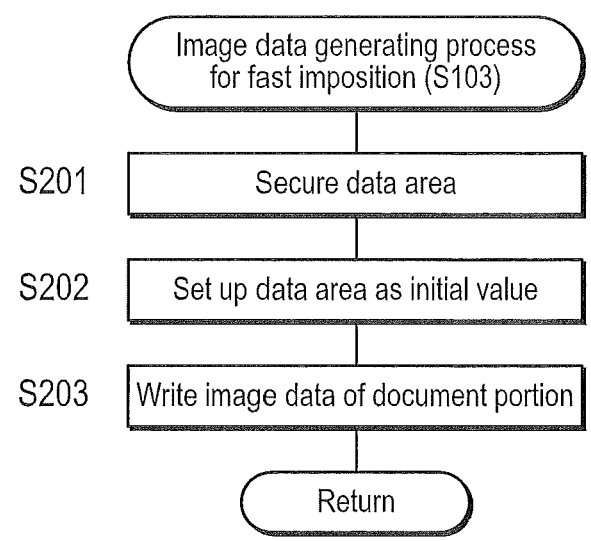
FIG. 8 is a flowchart for describing the image data generating process for fast imposition shown in step S103 of FIG. 7.

FIG. 8 is a flowchart for describing the image data generating process for fast imposition shown in step S103 of FIG. 7.

As shown in FIG. 8, in the image data generating process for fast imposition according to the present embodiment, first, a data area greater than the data area of the document portion is secured based on the data block size that can be processed by the hardware circuit (step S201). More specifically, in case when the data size of the image data of the document portion is X×Y dots and the data block size that can be processed by the hardware circuit is N×N dots, a data area of [N×roundup (X/N)]×[N×roundup (Y/N)] is secured using a function "roundup (b)" that rounds up b in such a way as to nullify the number of digits after the decimal point zero. For example, if the data size of the image data of the document portion is 14×22 dots and the block size of the data that can be processed by the hardware circuit is 8×8 dots, a data area of 16×24 dots is secured.

Next, the value of the data area is set as the initial value (step S202). In the present embodiment, the value of the data area secured in the process shown in step S201 is set to an initial value of zero, which is the color information that causes the printed image to be colorless.

Next, the image data of the document portion is written into the data area (step S203). In the present embodiment, the image data of the document portion is written into in the bitmap format from the top of the data area secured in the process shown in step S201 skipping the data area that corresponds to the padding data, based on the drawing information of the print data received in the process shown in step S101 of FIG. 7. Since the data size (X×Y dots) of the image data of the document portion is smaller than the data size of the data area secured in the process shown in step S201, padding data of the preset value of zero is generated in the data area of the image data where the image data of the document portion was not written.

As can be seen from the above, a data area that can be handled by the hardware circuit is secured and the image data of the document portion is written into the data area according to the process of the flowchart shown in FIG. 8. The padding data has been added to the predetermined position of the image data thus formed.

Figure 9:
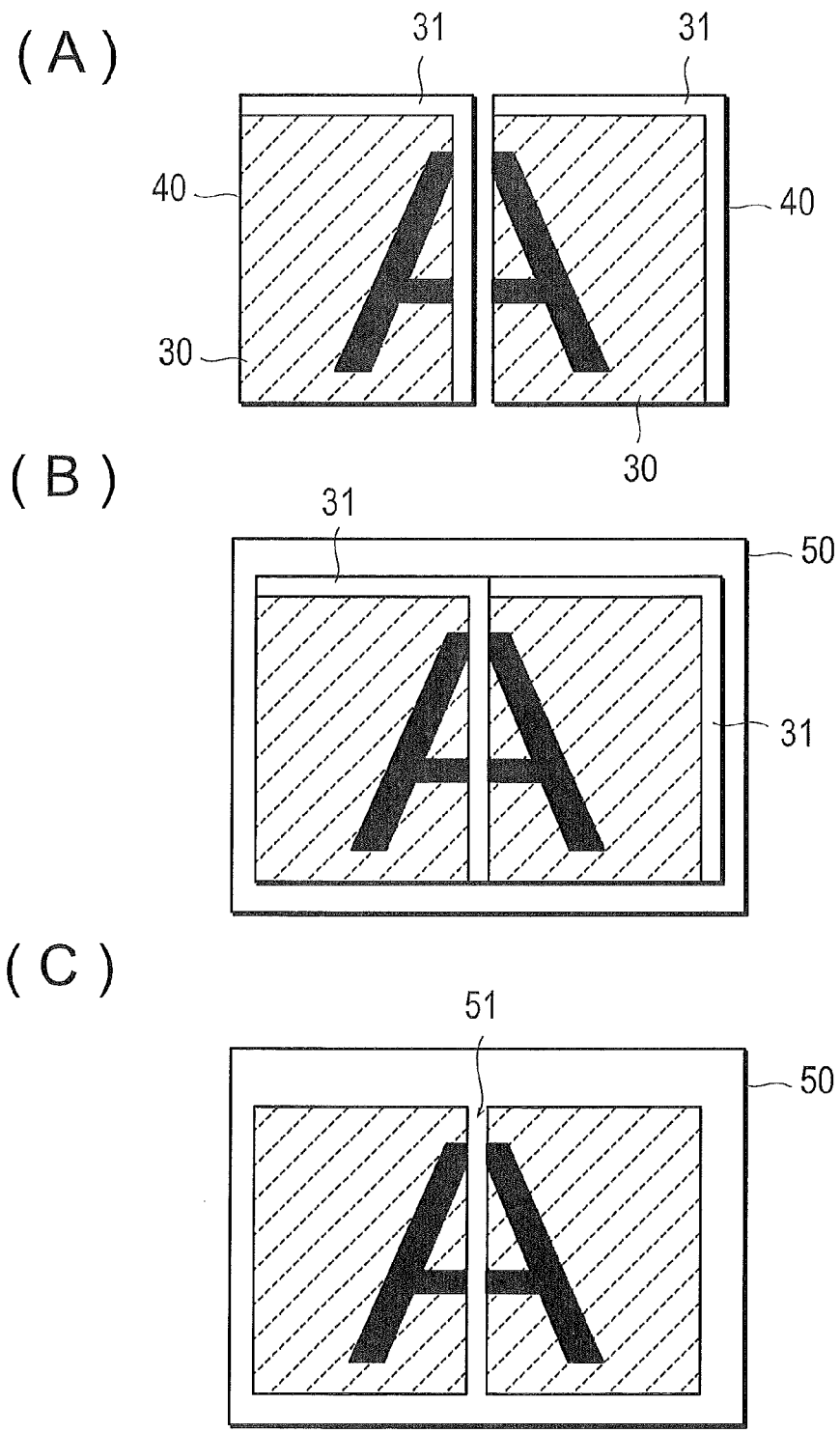
FIG. 9 is a diagram for describing the image data generated by the image data generating process for fast imposition.

FIG. 9 is a diagram for describing the image data generated by the image data generating process for fast imposition.

According to the process of flowchart shown in FIG. 8, the image data 40 with the padding data 31 added to a predetermined position is generated as shown in FIG. 9 (A). In imposing the image data 40, the padding data 31 is located in the boundary area between the two image data 40 as shown in FIG. 9 (B). Therefore, when the imposition process is executed in the fast mode, a linear blank area 51 is generated, for example, in the boundary area between the images for two pages printed on a sheet of paper 50 as shown in FIG. 9 (C). This blank space becomes conspicuous in case of an image that extends over two pages (for example, painted-out images, two-page spread images, etc.) and may affect the appearance of printed matter.

Next, the image data generating process for precision imposition shown in step S104 of FIG. 7 will be described with reference to FIGS. 10 through 19.

Figure 10:
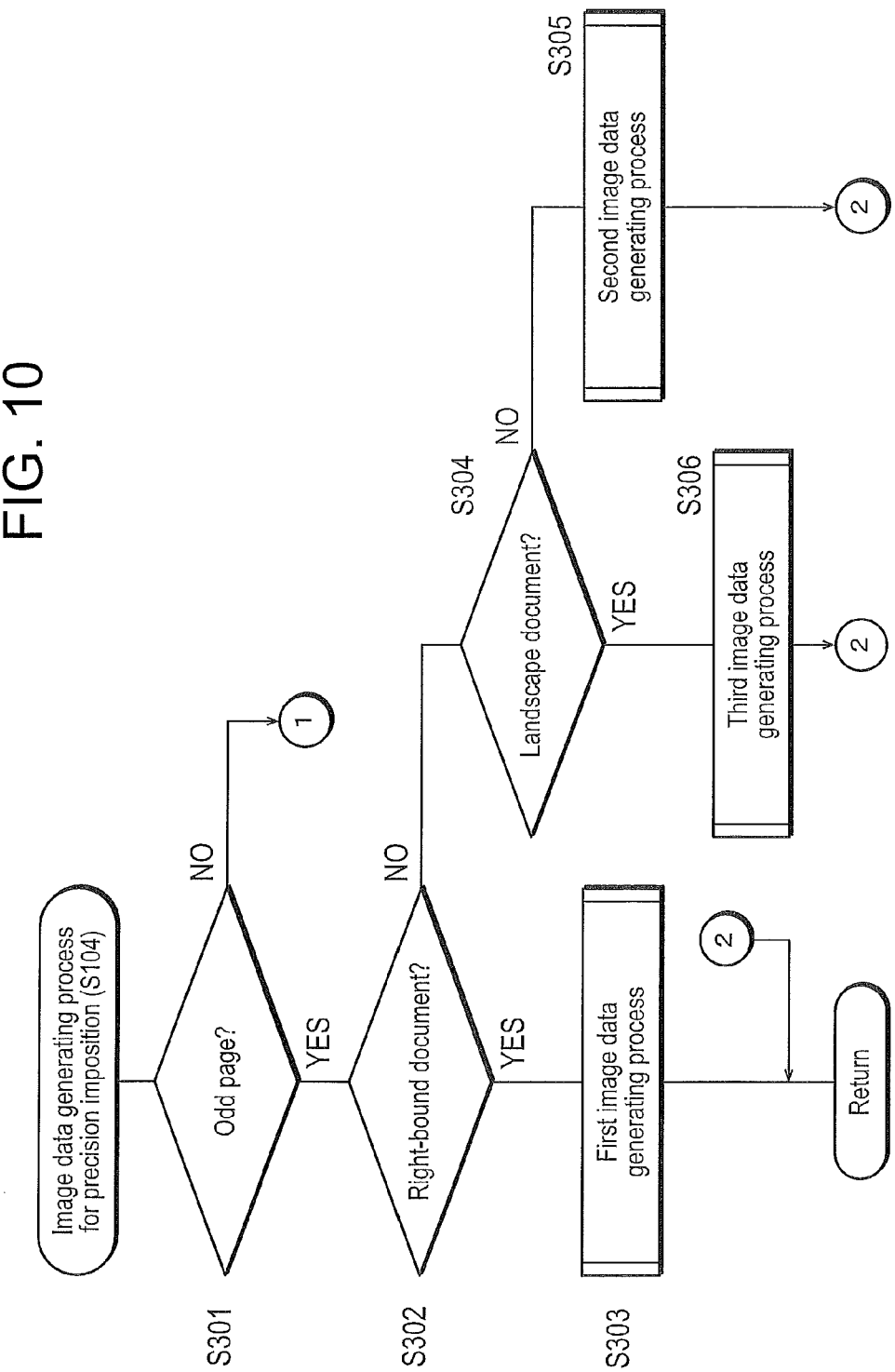
FIG. 10 is a flowchart for describing the image data generating process for precision imposition shown in step S104 of FIG. 7.
Figure 11:
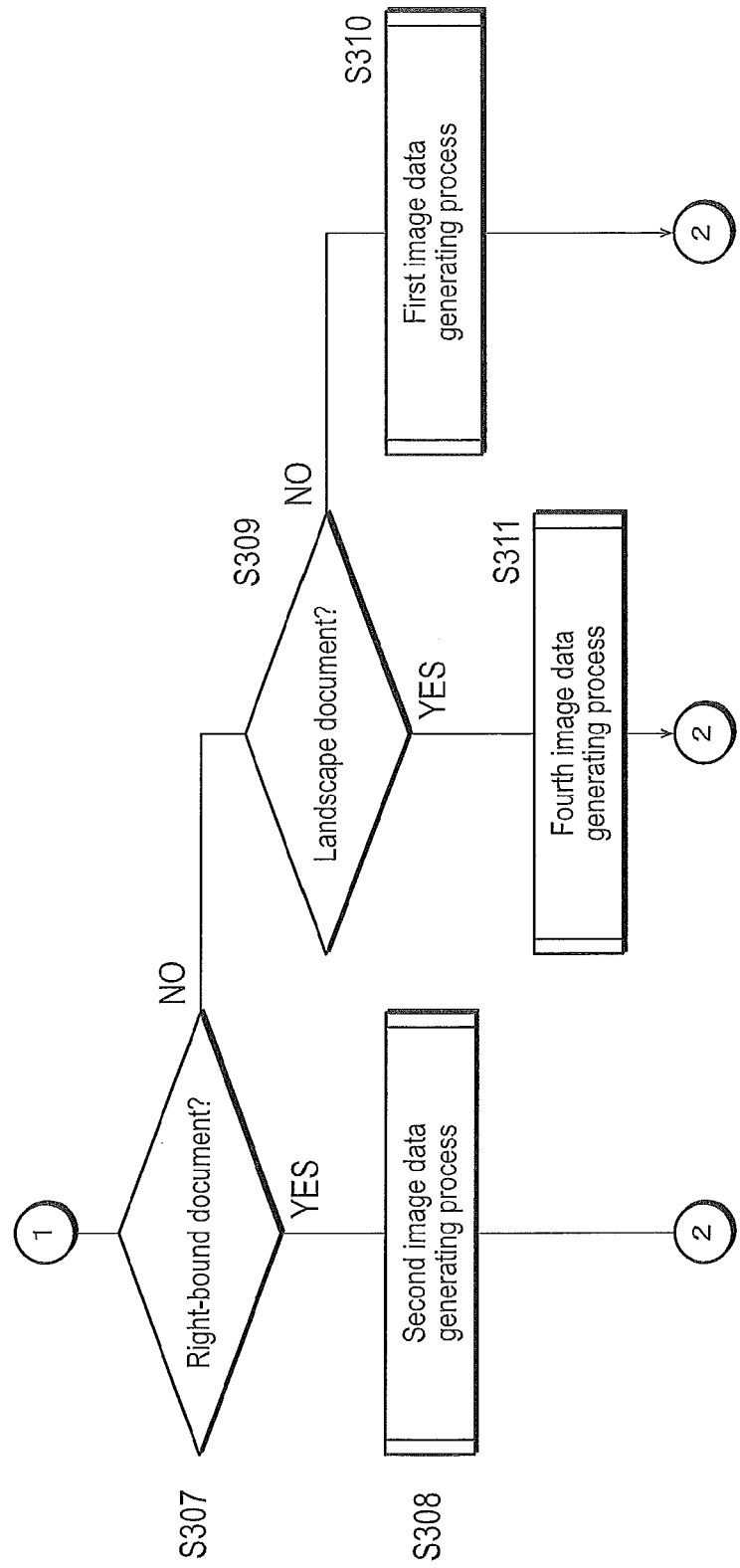
FIG. 11 is a flowchart following that of FIG. 10.

FIGS. 10 and 11 are a flowchart for describing the image data generating process for precision imposition shown in step S104 of FIG. 7.

As shown in FIG. 10, in the image data generating process for precision imposition according to the present embodiment, first, a judgment is made as to whether the image of one page for which image data will be generated is an image of an odd number page or not (step S301). In the present embodiment, a judgment is made as to whether the particular image is that of an odd number page or even number page based on the print data received in the process shown in step S101 of FIG. 7.

If it is judged that the image is not an image of an odd number page (step S301: No), it concludes that the image is an image of an even number page, and moves to the process shown in step S307. On the other hand, if it is judged that the image is an image of an odd number page (step S301: Yes), a judgment is made as to whether the document to be printed is a right-bound document or not (step S302). In the present embodiment, a judgment is made as to whether the document to be printed is a right-bound document or not based on the printing setting information of the print data received in the process shown in step S101 of FIG. 7.

Figure 12:
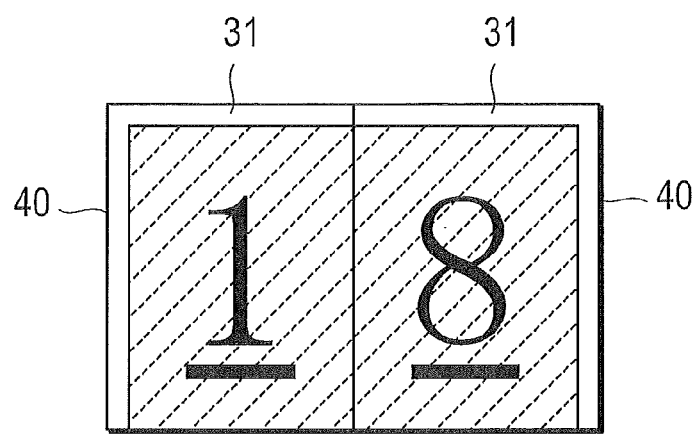
FIG. 12 is a diagram for describing the relation between the page number of the image and the binding position of the document to be printed.
Figure 12:
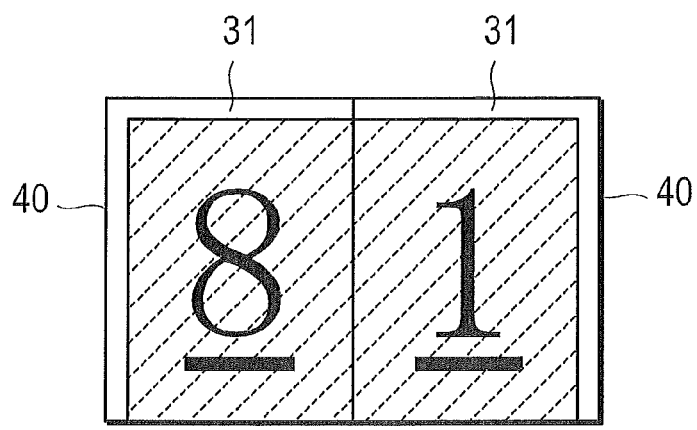
Figure 12:
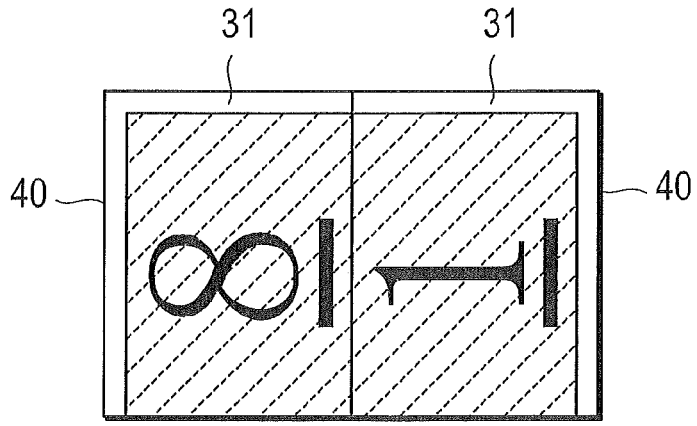

If it is judged that the document to be printed is a right-bound document (step S302: Yes), image data in which the padding data is not located in the data area that corresponds to the right edge of the image is generated (step S303). For example, as shown in FIG. 12 (A), if the image for which image data will be generated consists of an image of the first page of the document to be printed that consists of eight pages, and the document to be printed is a right-bound document, the boundary area between the first page image and the eighth page image is determined first. Then, image data is generated with padding data added in a data area that corresponds to the edge opposite to said boundary area (i.e., the left edge) of the first page image. The details of the first image data generating process that generates image data in which the padding data is not located in the data area that corresponds to the right edge of the image will be described later.

On the other hand, if it is judged that the document to be printed is not a right-bound document (step S302: No), a judgment is made as to whether or not the document to be printed is a landscape document (step S304). In contrast to a right-bound document in which sheets of paper are folded half in the left-right direction, sheets of paper are folded half in the top-bottom direction in case of a landscape document.

If it is judged that the document to be printed is not a landscape document (step S304: No), image data in which the padding data is not located in the data area that corresponds to the left edge of the image is generated based on the assumption that the document to be printed is a left-bound document (step S305). For example, as shown in FIG. 12 (B), if the image for which image data will be generated consists of an image of the first page of the document to be printed that consists of eight pages, and the document to be printed is a left-bound document, the boundary area between the first page image and the eighth page image is determined first. Then, image data is generated with padding data added in a data area that corresponds to the edge opposite to said boundary area (i.e., the right edge) of the first page image.

On the other hand, if it is judged that the document to be printed is a landscape document (step S304: Yes), image data in which the padding data is not located in the data area that corresponds to the top edge of the image is generated (step S306). For example, as shown in FIG. 12 (C), if the image for which image data will be generated consists of an image of the first page of the document to be printed that consists of eight pages, and the document to be printed is a landscape document, the boundary area between the first page image and the eighth page image is determined first. Then, image data is generated with padding data added in a data area that corresponds to the edge opposite to said boundary area (i.e., the bottom edge) of the first page image.

As described in the above, according to the process shown in steps S301 through S306, it is first judged as to whether the image for which the image data will be generated is an image that belongs to an odd number page or not. If it is judged that the image belongs to an odd number page, the boundary area of the image to be printed on a sheet of paper is determined based on the binding position of the document to be printed, and image data of the odd number page with padding data added in the data area corresponding to the edge opposite to the boundary area.

On the other hand, in the process shown in step S301, if it is judged that the image is an image of an even number page (step S301: No), a judgment is made as to whether the document to be printed is a right-bound document or not (step S307).

If it is judged that the document to be printed is a right-bound document (step S307: Yes), image data in which the padding data is not located in the data area that corresponds to the left edge of the image is generated (step S308). For example, as shown in FIG. 12 (A), if the image for which image data will be generated consists of an image of the eighth page of the document to be printed that consists of eight pages, and the document to be printed is a right-bound document, the boundary area between the first page image and the eighth page image is determined first. Then, image data is generated with padding data added in a data area that corresponds to the edge opposite to said boundary area (i.e., the right edge) of the eighth page image.

On the other hand, if it is judged that the document to be printed is not a right-bound document (step S307: No), a judgment is made as to whether the document to be printed is a landscape document or not (step S309). If it is judged that the document to be printed is not a landscape document (step S309: No), image data in which the padding data is not located in the data area that corresponds to the right edge of the image is generated based on the assumption that the document to be printed is a left-bound document (step S310). For example, as shown in FIG. 12 (B), if the image for which image data will be generated consists of an image of the eighth page of the document to be printed that consists of eight pages, and the document to be printed is a left-bound document, the boundary area between the first page image and the eighth page image is determined first. Then, image data is generated with padding data added in a data area that corresponds to the edge opposite to said boundary area (i.e., the left edge) of the eighth page image.

On the other hand, if it is judged that the document to be printed is a landscape document (step S309: Yes), image data in which the padding data is not located in the data area that corresponds to the bottom edge of the image is generated (step S311). For example, as shown in FIG. 12 (C), if the image for which image data will be generated consists of an image of the eighth page of the document to be printed that consists of eight pages, and the document to be printed is a landscape document, the boundary area between the first page image and the eighth page image is determined first. Then, image data is generated with padding data added in a data area that corresponds to the edge opposite to said boundary area (i.e., the upper edge) of the eighth page image.

As described in the above, according to the process shown in steps S307 through S311, the boundary area of the image to be printed on a sheet of paper is determined based on the binding position of the document to be printed, and image data of the even number page with padding data added in the data area corresponding to the edge opposite to the boundary area.

Moreover, according to the process of the flowchart sown in FIGS. 10 and 11, image data in which the position of the padding data has been changed is generated based on the page number of the image and the binding position of the document to be printed. More specifically, image data is generated with padding data added in the data area corresponding to the edge opposite to the boundary area between the images for two pages to be printed on a sheet of paper as shown in FIG. 12.

Next, the first through fourth image data generating processes shown in FIGS. 10 and 11 will be described below with reference to FIG. 13 through FIG. 18.

Figure 13:
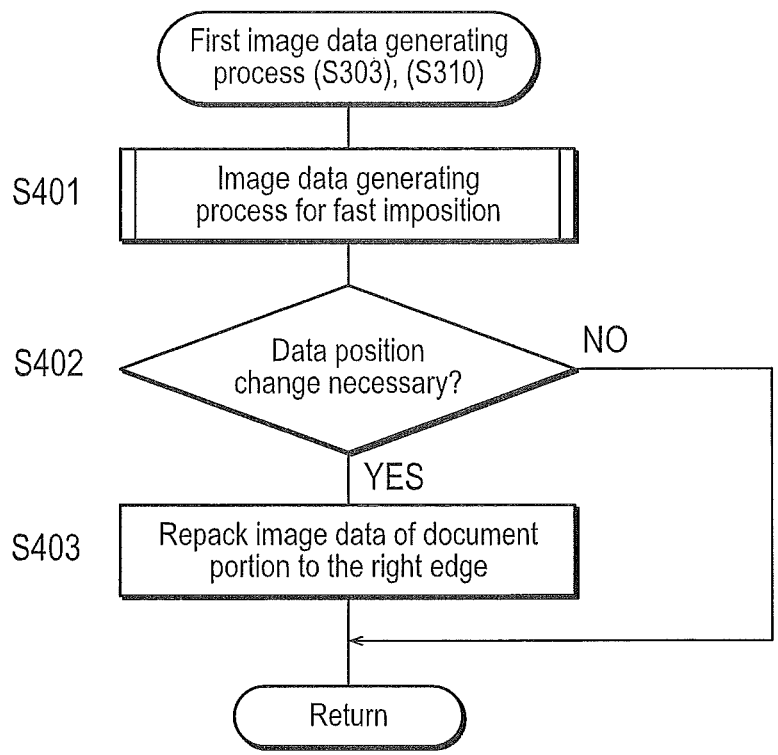
FIG. 13 is a flowchart for describing the first image data generating process shown in step S303 of FIG. 10 and step S310 of FIG. 11.

FIG. 13 is a flowchart for describing the first image data generating process shown in step S303 of FIG. 10. As described above, in the first image data generating process shown in step S303 of FIG. 10, image data in which the padding data is not located in the data area that corresponds to the right edge of the image is generated.

Figure 14:
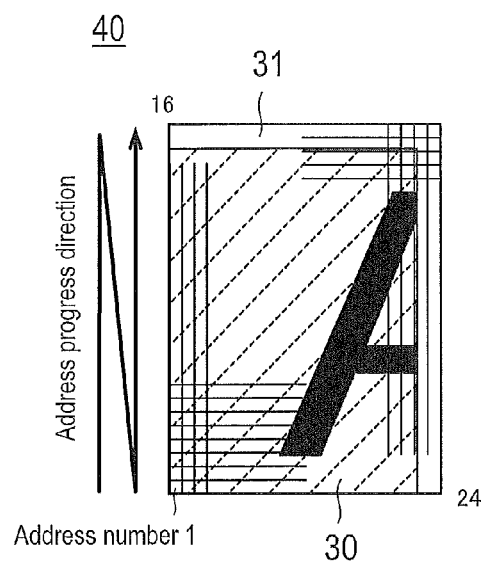
FIG. 14 is a diagram for describing the process of repacking the image data of the document portion in the image data.
Figure 14:
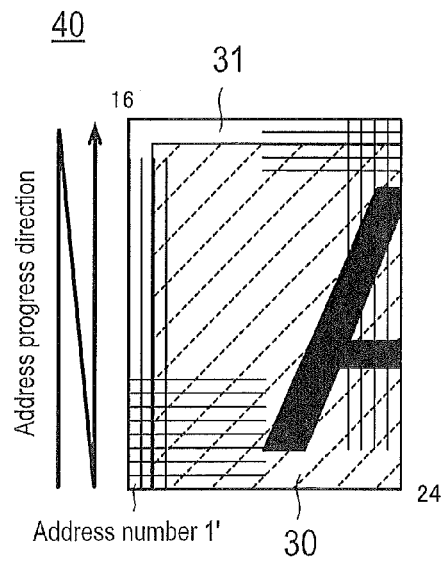

As shown in FIG. 13, in the first image data generating process according to the present embodiment, first, the image data generating process for fast imposition is executed (step S401). In the present embodiment, image data is generated with padding data added to the predetermined position regardless of the boundary area of the image data. For example, as shown in FIG. 14 (A), the image data 40 is generated with the padding data having 22×2 dots located at the top edge and 2×16 dots located at the right edge based on the image data of the document portion 30 having the data size of 22×14 dots.

Next, a judgment is made as to whether there is a need for changing the position of the padding data or not (step S402). In the present embodiment, it is judged that it is necessary to relocate the padding data, if the edge of the image that corresponds to the position of the padding data added to the image data generated in the process shown in step S401 is located on the same side as the boundary area of the images for two pages to be printed on a sheet of paper. For example, while the boundary area of the image is on the right side, the position on the image that corresponds to the position of the padding data 31 is also on the right side in FIG. 14 (A), so that it is judged that the position of the padding data 31 needs to be changed. Furthermore, if the position of the padding data is predetermined in the process shown in S103, it is possible to judge whether or not it is necessary to change the position of the padding data based on the binding direction and whether it is an odd or even number page (for example, if it is decided to generate image data with padding data located at the top edge and right edge of the page, it is necessary to change the position of the image data of the document portion for an even number page in case of a left-bound or top-bound document, while such a change is unnecessary for an odd number page; also, it is necessary to change the position of the image data of the document portion for an odd number page in case of a right-bound document, while such a change is unnecessary for an even number page. More over, as mentioned later, if a value set for "gutter" is not an integral multiple of blocks, it is necessary to change the position of the image data of the document portion in such a way as to make the value of "gutter" to be a setting value).

If it is judged that the position of the padding data is necessary to be changed (step S402: Yes), the image data of the document portion is repacked (step S403). In the present embodiment, the image data of the document portion included in the image data generated in the process shown in step S401 is repacked into the predetermined data area in the buffer area of the RAM 23. More specifically, the data of the addresses 1 through 350 of the image data 40 shown in FIG. 14 (A) is copied to the data area of said predetermined data area which is preset to the initial value of zero. The padding data 31 is generated in the data area corresponding to the edge on the opposite side of the boundary area of the image data 40 as the image data of the document portion 30 is copied to the data area of said predetermined data area. As a consequence, the image data 40 is generated with the positing of the padding data 31 being changed as shown in FIG. 14 (B). The data in the addresses 1' through 384' is transferred to the imposing unit 15 as shown in FIG. 14 (B).

Figure 15:
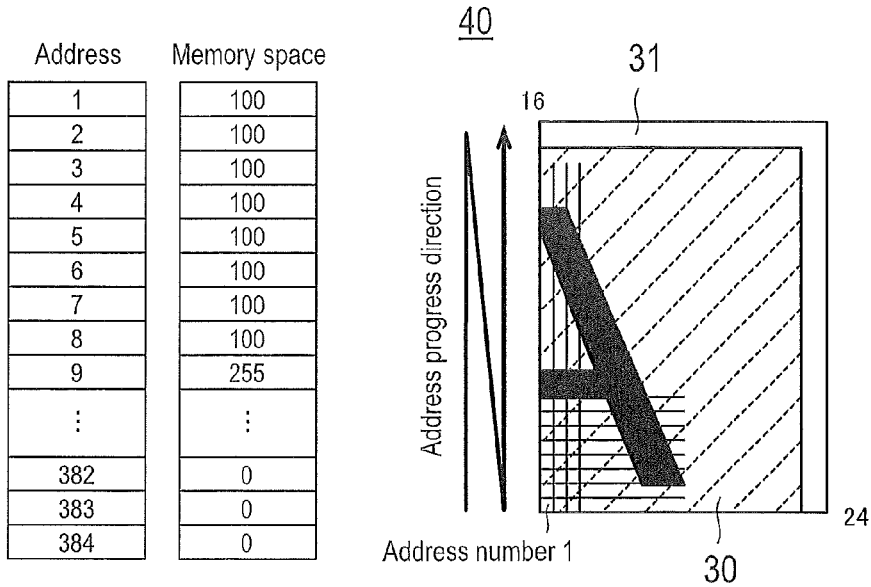
FIG. 15 is a diagram for describing the process of the image data of the document portion being delivered to the imposing unit without being repacked.

On the other hand, if it is judged that the position of the padding data is not necessary to be changed (step S402: No), the process is terminated. For example, if the edge of the image that corresponds to the position of the padding data added to the image data 40 generated in the process shown in step S401 is not on the same side as the boundary area of the images for two pages to be printed on a sheet of paper as shown in FIG. 15, the image data of the document portion 30 is transferred to the imposing unit 15 without being repacked.

As can be seen from the above, according to the process of the flowchart shown in FIG. 13, image data is generated with padding data added in the data area corresponding to the edge opposite to the boundary area of the images for a plurality of pages to be printed on a sheet of paper. In other words, according to the first image data generating process shown in step S303 of FIG. 10, image data is generated with padding data added in the data area that corresponds to the left edge of the image, which is the edge opposite to the boundary areas with other images. In other words, image data with padding data located not in the data area that corresponds to the right edge of the image is generated.

Figure 16:
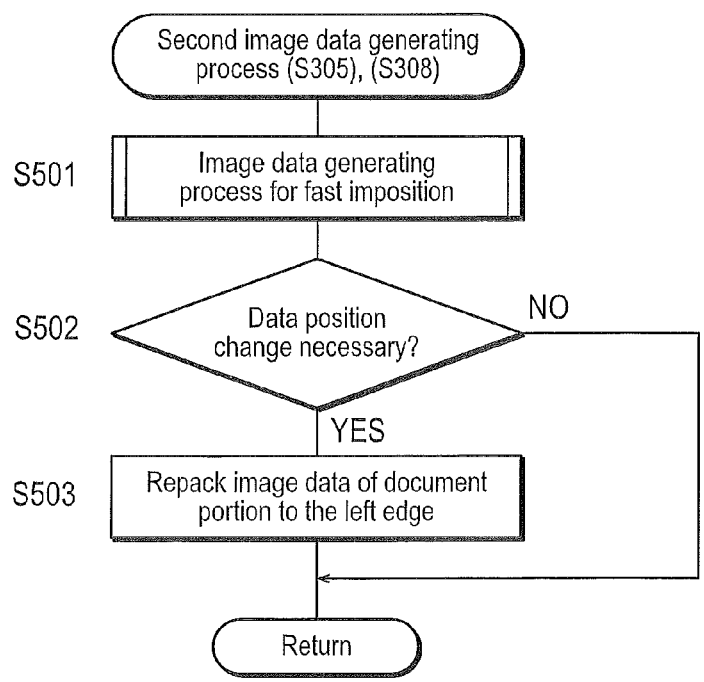
FIG. 16 is a flowchart for describing the second image data generating process shown in step S305 of FIG. 10 and step S308 of FIG. 11.
Figure 17:
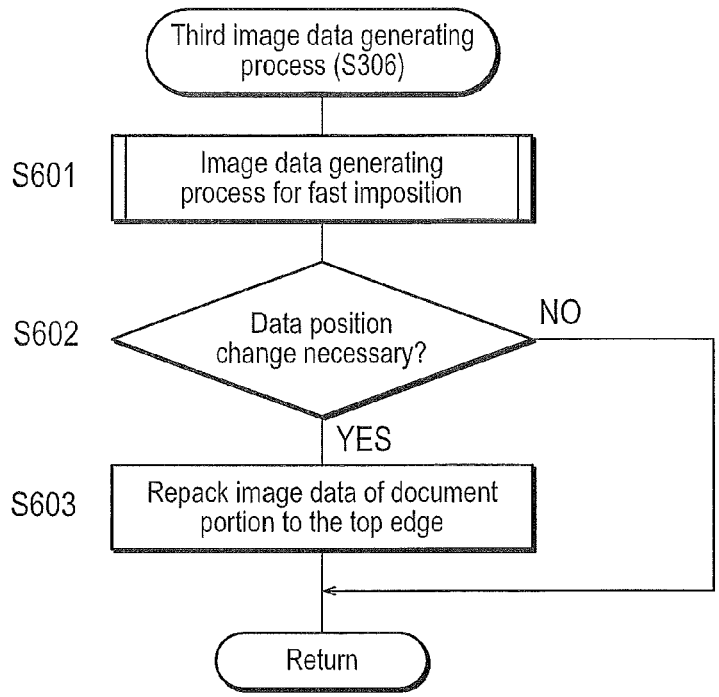
FIG. 17 is a flowchart for describing the third image data generating process shown in step S306 of FIG. 10.
Figure 18:
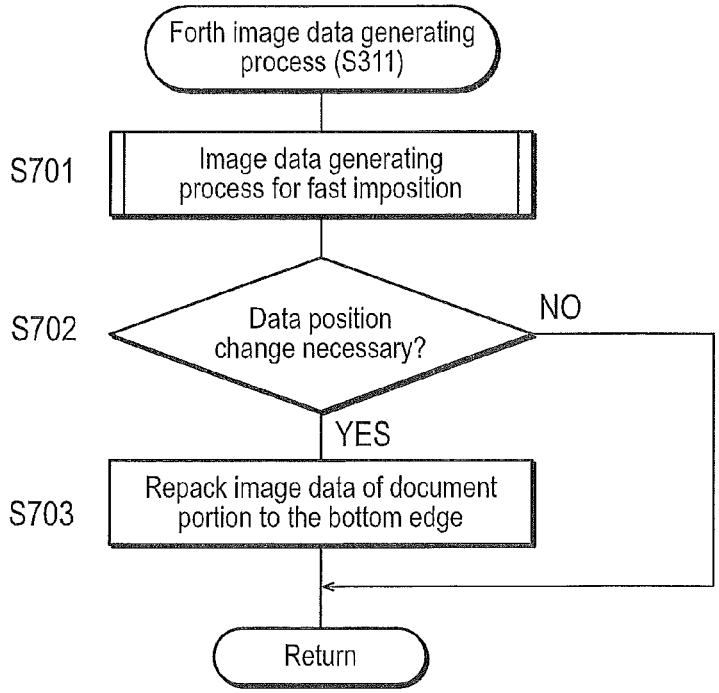
FIG. 18 is a flowchart for describing the fourth image data generating process shown in step S311 of FIG. 11.

FIGS. 16 through 18 are flowcharts for describing the second through fourth image data generating processes shown in FIGS. 10 and 11. Since the second through fourth image data generating processes are similar to the first image data generating process except that the boundary area of the image which is used as a reference for changing position of the padding data, so that the detailed description of the second through fourth image data generating processes are omitted.

Figure 19:
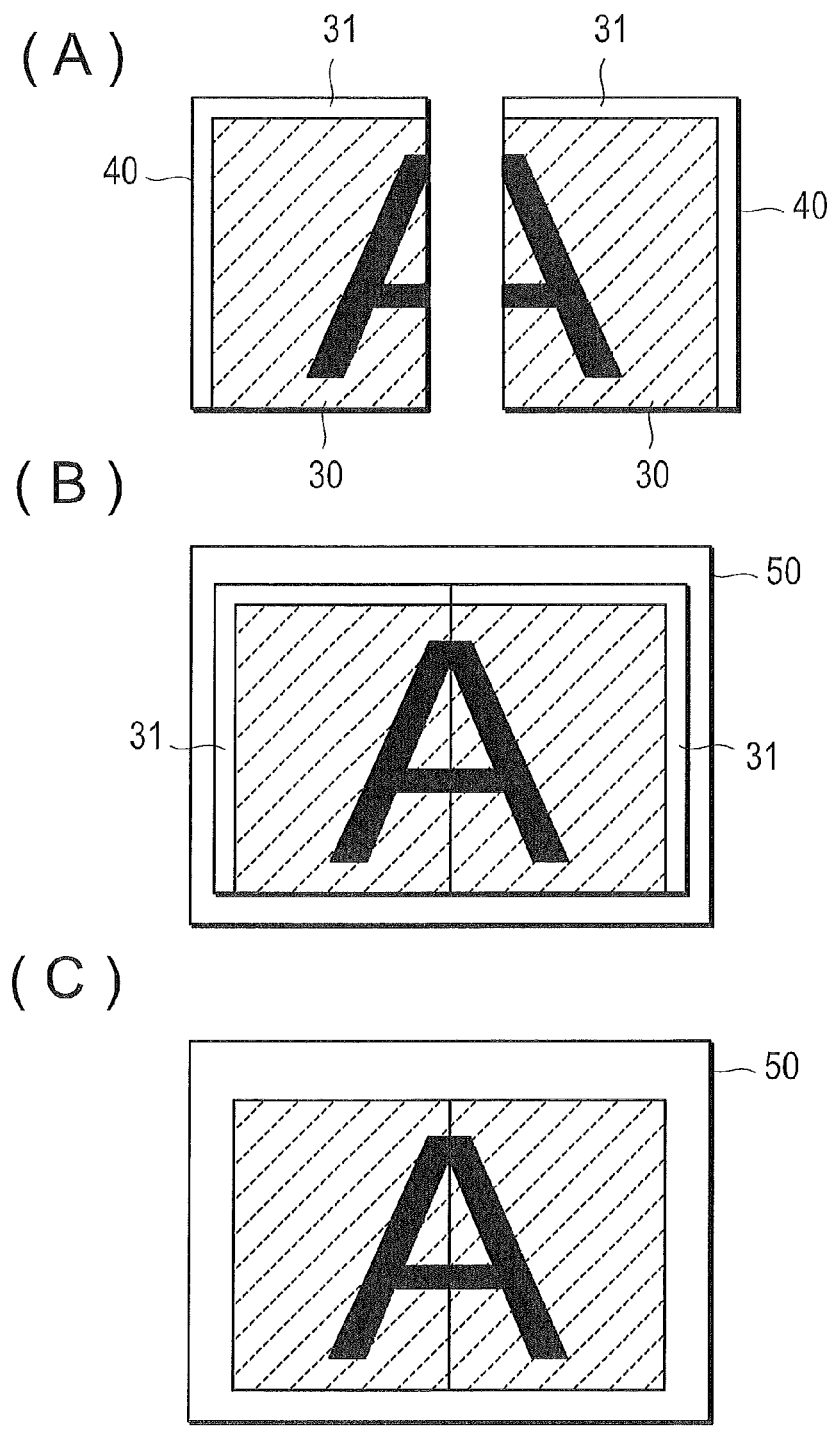
FIG. 19 is a diagram for describing the image data generated by the image data generating process for precision imposition.

According to the first through fourth image data generating processes, for example, the image data 40 is generated with the padding data 31 added in the data area corresponding to the edge opposite to the boundary area of the image as shown in FIG. 19 (A). As a consequence, the padding data 31 is not located in the boundary area of the image data in the printing image data generated as a result of imposing image data for two pages as shown in FIG. 19 (B). In other words, "gutter" is not formed in the boundary area of the images for two pages printed on a sheet of paper 50 as shown in FIG. 19 (C). Thus, the blank space is formed as specified between the images for two pages to be printed on a sheet of paper according to the present embodiment.

Next, the central layout information generating process and the image position adjusting process shown in steps S105 and S107 of FIG. 7 will be described below with reference to FIG. 20.

As described above, the hardware circuit for executing the imposition process processes the image data in increments of data of a specific block size. Therefore, the images for two pages based on the printing image data generated by imposing two image data may not be printed in the center of a sheet of paper.

Figure 20:
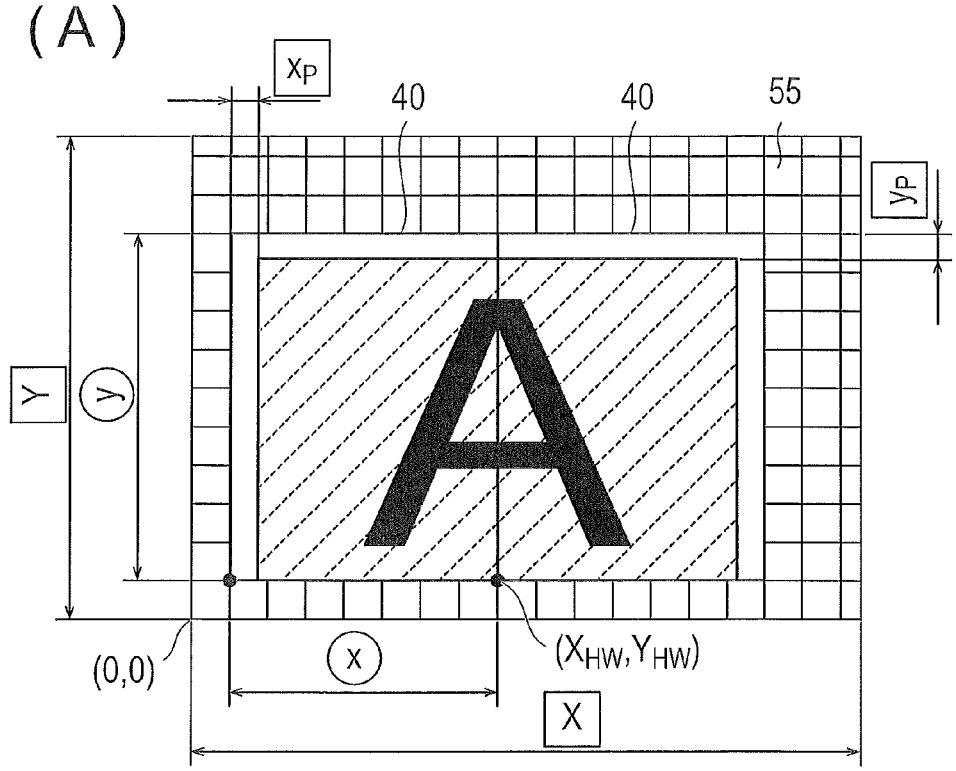
FIG. 20 is a diagram for describing the central layout information generating process and the image position adjusting process shown in steps S105 and S107 of FIG. 7.
Figure 20:
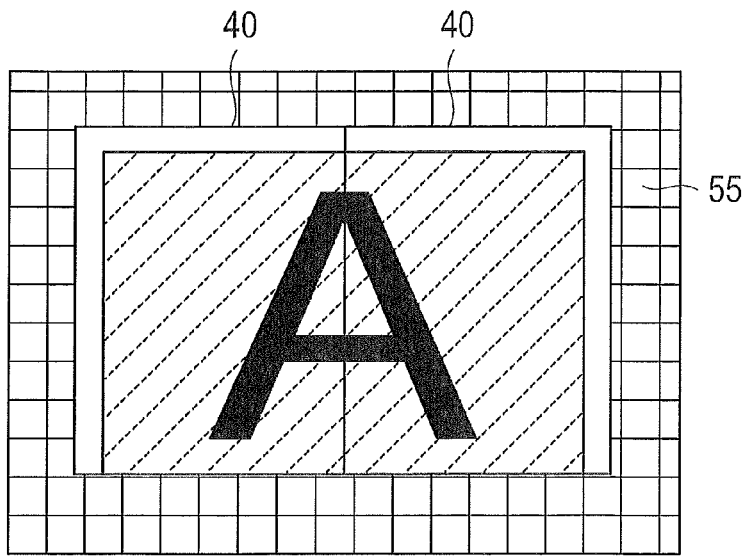

FIG. 20 (A) is a diagram showing an example of the printing image data generated by the hardware circuit. In FIG. 20 (A), a area shown in a reticular pattern corresponds to the size of a sheet of paper and a square (hereinafter referred to as a "block") 55 corresponds to the data unit of a block size which can be processed by the hardware circuit. At this point, the size of the sheet of paper is, in most cases, not an integral multiple of the block. Also, the image data for one page is an integral multiple of the block. In the imposition process executed by the hardware circuit, the image data 40 is imposed in increments of block 55.

In FIG. 20 (A), X and Y represent the length of the longer side and the length of the shorter side of a sheet of paper respectively, while x and y represent the length of the shorter side and the length of the longer side of the image data for one page. Also, $x_p$ and $y_p$ represent the data widths of the padding data. Assuming the bottom left corner of the sheet of paper is the coordinate origin (0,0), and the coordinate of the bottom left corner of the image data 40 on the right side of the printing image data is ($X_{HW}$, $Y_H$), the shift amount $X_{shift}$, $Y_{shift}$ of the printing image data from the center of the sheet of paper can be expressed in the following formulas (1) and (2):

$$X_{Shift}=X/2-X_{HW} \quad (1)$$

$$Y_{Shift}=(Y-(y-y_p))/2-Y_{HW} \quad (2)$$

Different from the present embodiment, the shift amount $Y_{shift}$ can be expressed in the following formula (3), if the padding data is located at the bottom edge of the image data:

$$Y_{Shift}=(Y-(y-y_p)/2-(Y_{HW}+y_p) \quad (3)$$

Based on the central layout information generated by formulas (1) and (2), the position of the printing image data is adjusted, for example, dot by dot. More specifically, the adjustment is made dot by dot on the positions of two image data in the printing image data, with the padding data added to the periphery in such a way as to fit the size of the sheet of paper. According to the present embodiment, as the position of the printing image data is adjusted dot by dot, the image printed based on the printing image data locates in the center of the sheet of paper as shown in FIG. 20 (B).

In the embodiment described in the above, the position of the image data in the printing image data with the padding data added to the periphery is adjusted dot by dot in such a way as to have the image based on the printing image data printed in the center of the sheet of paper. However, the position of the printing image data to be printed on a sheet of paper can be adjusted by adjusting the drawing start position in the printing process by the printing unit 16.

Also, the embodiment has been described in the above using a case where "No center blank space" is set up as a printing condition in order to simplify the explanation. However, it is possible to form a center blank space (gutter) between the images for a plurality of pages to be printed on a sheet of paper.

Figure 21:
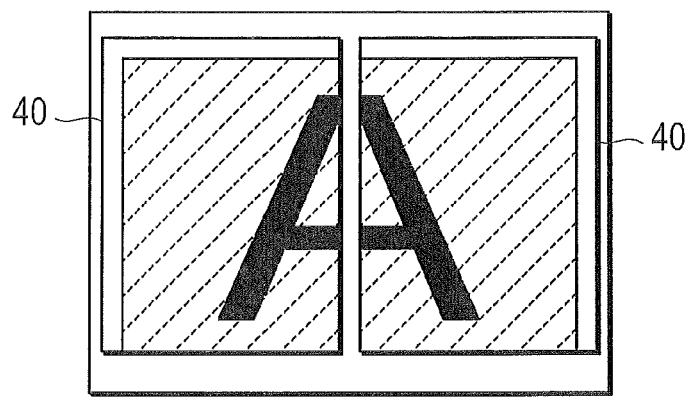
FIG. 21 is a diagram for describing the imposition process upon which the printing setting information concerning the center blank space is reflected.
Figure 21:
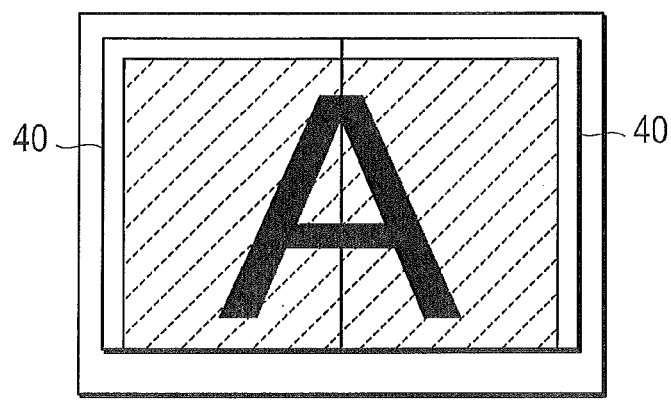
Figure 21:
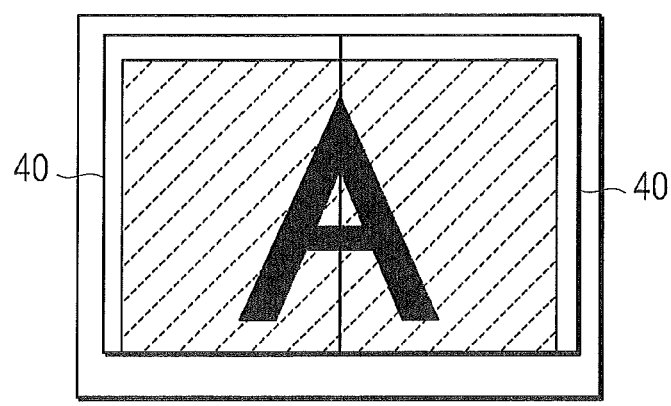

FIG. 21 is a diagram for describing the imposition process upon which the printing setting information concerning the center blank space is reflected. For example, FIG. 21 (A) is a diagram showing the images for two pages having a center blank space of 10 mm width, while FIG. 21 (B) is a diagram showing the images for two pages having a center blank space of 0 mm width (i.e., "No center blank space"). For example, FIG. 21 (C) is a diagram showing the images for two pages having a center blank space of –10 mm width. As can be seen from FIG. 21 (A) through FIG. 21 (C), the space between the images for two pages to be printed on a sheet of paper is adjustable in accordance with the printing setting concerning the center blank space included in the print data.

If the central blank space is specified to be 10 mm, the blank space of the image based on the printing image data generated by the imposition process according to "refined mode" described above is formed with a width of 10 mm as shown in FIG. 21 (A). More specifically, if this 10 mm is not an integral multiple of blocks, the image data of the document portion is relocated to a position which causes the center blank space to be 10 mm wide to form a center blank space as specified. However, the blank space of the image based on the printing image data generated by the imposition process according to the "fast mode" described above is formed wider than 10 mm by the amount of the blank space due to the padding data added to the image data 40.

According to the present embodiment, as described in the above, a blank space is formed as specified between images for a plurality of pages printed on a sheet of paper, as the blank space due to the padding data is prevented from being formed in the boundary area of the images for a plurality of pages to be printed on a sheet of paper. In particular, in case a printing condition is set up as "No center blank space," a linear blank space is prevented from being formed in the seam between images for a plurality of pages to be printed on a sheet of paper. Therefore, according to the present embodiment, fine appearances of printed matters can be secured in the imposition process for image data with a limited data size.

The invention is not limited to the embodiment described above, but also can be changed in various ways within the scope of the claims.

For example, in the embodiment described above, the position of the padding data is changed based on the page number of the image and the binding position of the document to be printed after the image data with the padding data added to the predetermined position has been generated. However, it is also possible to determine the position of the padding data based on the page number of the image and the binding position of the document to be printed prior to the generation of the image data, and to generate the image data with the padding data added to the determined position.

Also, in the embodiment described above, the position of the padding data in the image data is changed by repacking the image data of the document portion in the predetermined area of the buffer area after generating the image data with the padding data added to the predetermined position. However, in transferring the image data with the padding data added to the predetermined position to the imposing unit, the position of the padding data in the image data received by the imposing unit which consists of the hardware circuit can be changed by shifting the transfer timing from the normal timing. More specifically, when padding data is added to, for example, addresses 353-384 in image data with a data size of 24×16 dots, the padding data is relocated to addresses 1-32 of the image data received by the imposing unit by delaying the transfer timing from the normal timing.

Also, in the embodiment described above, a process of changing the position of the padding data in the image data is executed by the printer. However, it is possible for the client PC to be arranged alternatively in such a way as to execute the process of changing the position of the padding data in the image data generated by the printer. In this case, the print data is generated by means of the printer driver of the client PC in such a way that the drawing information is changed for each page, for example, based on the page number of the image and the binding position of the document to be printed, so that the padding data will be added in the data area corresponding to the edge opposite to the above mentioned boundary area of the image, when the print data is generated by the printer.

Also, in the embodiment described above, the image for one page of the document to be printed is a general image formed smaller than the size of the corresponding area in a sheet of paper in the printing setting. However, if the image for one page of the document to be printed is larger than the size of the corresponding area in the sheet of paper, image data with no padding data can be generated by cutting out data that is an integral multiple of the abovementioned block size from the imaged data of the document portion generated based on the print data. In this case, the image data of the integral multiple of the abovementioned block size is cut out from the image data of the document portion using the boundary area of the images for two pages as a standard. The image data generated as such has no padding data, so that the image printed in a sheet of paper will have no blank space due to the padding data.

The units and method of conducting various processes in the printing control apparatus according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the printing control apparatus as a part of its function.

What is claimed is:

1. A printing system, comprising:
a central processing unit;
a print data generating unit for generating print data including drawing information of a document to be printed;
an image data generating unit for generating image data for each page having a data size of an integral multiple of a specified block size based on said print data;
a delivering unit for delivering said image data generated by said image data generating unit;
an imposing unit for imposing said image data delivered by said delivering unit in such a way that images for a plurality of pages of said document to be printed will be printed on a sheet of paper; and
a printing unit for printing images for a plurality of pages on a sheet of paper based on said image data imposed by said imposing unit, wherein
a process for preventing a blank space from being formed in a boundary area between said images for a plurality of pages to be printed on a sheet of paper due to padding data added to said image data in order to make data size of said image data to be an integral multiple of said block size, is executed in said print data generating unit, said image data generating unit, or said delivering unit.

2. The printing system as claimed in claim 1, further comprising:
a calculating unit for calculating said boundary area of said image based on said print data, wherein
said image data generating unit generates said image data with said padding data added in a data area corresponding to an edge opposite to said boundary area of said image based on said drawing information; and
said imposing unit imposes said image data with said padding data added in the data area corresponding to the edge opposite to said boundary area of said image.

3. The printing system as claimed in claim 1, further comprising:
a calculating unit for calculating said boundary area of said image based on said print data, wherein
said image data generating unit generates said image data with said padding data added in a data area corresponding to a predetermined edge of said image; and
said delivering unit relocates said padding data into a data area corresponding to an edge opposite to said boundary area of said image by changing timing for delivering said image data; and
said imposing unit imposes said image data after said padding data has been relocated into the data area corresponding to the edge opposite to said boundary area of said image.

4. The printing system as claimed in claim 1, wherein
said image data generating unit cuts out said image data having a data size of an integral multiple of said block size from a document image data generated based on said drawing information, if an image for one page included in said document to be printed is larger than a corresponding area of said sheet of paper; and
said imposing unit imposes said image data cut out into the data size of the integral multiple of said block size.

5. The printing system as claimed in claim 1, wherein
said print data generating unit generates said print data, so that said drawing information is changed based on a binding position of said document to be printed and a page number of said image in such a way that a position of said padding data in said image data generated by said image data generating unit corresponds to an edge opposite to said boundary area of said image; and
said image data generating unit generates said image data with said padding data added in a data area corresponding to the edge opposite to said boundary area of said image based on said print data for which said drawing information has been changed.

6. A printing method, comprising:
(a) generating print data including drawing information of a document to be printed;
(b) generating image data for each page having a data size of an integral multiple of a specified block size based on said print data;
(c) delivering said image data generated in said step (b);
(d) imposing said image data delivered in said step (c) in such a way that images for a plurality of pages of said document to be printed will be printed on a sheet of paper; and
(e) printing images for a plurality of pages on a sheet of paper based on said image data imposed in said step (d), wherein a process for preventing a blank space from being formed in a boundary area between said images for a plurality of pages to be printed on a sheet of paper due to padding data added to said image data in order to make data size of said image data to be an integral multiple of said block size, is executed in said step (a), (b), or (c).

7. The printing method as claimed in claim 6, further comprising:
   (f) calculating said boundary area of said image based on said print data, wherein
   said image data with said padding data added in a data area corresponding to an edge opposite to said boundary area of said image is generated based on said drawing information in said step (b); and
   said image data with said padding data added in the data area corresponding to the edge opposite to said boundary area of said image is imposed in said step (d).

8. The printing method as claimed in claim 6, further comprising:
   (f) calculating said boundary area of said image based on said print data, wherein
   said image data with said padding data added in a data area corresponding to a predetermined edge of said image is generated in said step (b); and
   said padding data is relocated into a data area corresponding to an edge opposite to said boundary area of said image by changing timing for delivering said image data in said step (c); and
   said image data after said padding data has been relocated into the data area corresponding to the edge opposite to said boundary area of said image is imposed in said step (d).

9. The printing method as claimed in claim 6, wherein
   said image data having a data size of an integral multiple of said block size is cut out from a document image data generated based on said drawing information in said step (b), if an image for one page included in said document to be printed is larger than a corresponding area of said sheet of paper; and
   said image data cut out into the data size of the integral multiple of said block size is imposed in said step (d).

10. The printing method as claimed in claim 6, wherein
    said print data is generated in said step (a), so that said drawing information is changed based on a binding position of said document to be printed and a page number of said image in such a way that a position of said padding data in said image data generated in said step (b) corresponds to an edge opposite to said boundary area of said image; and
    said image data with said padding data added in a data area corresponding to the edge opposite to said boundary area of said image is generated based on said print data for which said drawing information has been changed, in said step (b).

11. A printing control apparatus, comprising:
    a central processing unit;
    a receiving unit for receiving print data including drawing information of a document to be printed;
    a calculating unit for calculating a boundary area of images for a plurality of pages of said document to be printed on a sheet of paper based on said print data;
    an image data generating unit for generating image data for each page with padding data added in a data area corresponding to an edge opposite to said boundary area of said image in such a way that said image data has a data size of an integral multiple of a specified block size, based on said drawing information; and
    an imposing unit for imposing said image data in such a way that said images for a plurality of pages will be printed on a sheet of paper.

12. The printing control apparatus as claimed in claim 11, wherein
    said image data generating unit includes:
    a basic image data generating unit for generating basic image data with said padding data added in a data area corresponding to a predetermined edge of said image; and
    a relocating unit for relocating said padding data into said data area corresponding to the edge opposite to said boundary area of said image, if said predetermined edge of said image is on the same side as said boundary area.

13. The printing control apparatus as claimed in claim 11, further comprising:
    a shift amount calculating unit for calculating a shift amount of overall images for a plurality of pages printed on a sheet of paper based on the imposed image data from a center of said sheet of paper; and
    an adjusting unit for adjusting a printing position of said imposed image data in order to reduce said shift amount.

14. A printing control method, comprising:
    (a) receiving print data including drawing information of a document to be printed;
    (b) calculating a boundary area of images for a plurality of pages of said document to be printed on a sheet of paper based on said print data;
    (c) generating image data for each page with padding data added in a data area corresponding to an edge opposite to said boundary area of said image in such a way that said image data has a data size of an integral multiple of a specified block size, based on said drawing information; and
    (d) imposing said image data in such a way that said images for a plurality of pages will be printed on a sheet of paper.

15. The printing control method as claimed in claim 14, wherein
    said step (c) includes:
    (c1) generating basic image data with said padding data added in a data area corresponding to a predetermined edge of said image; and
    (c2) relocating said padding data into said data area corresponding to the edge opposite to said boundary area of said image, if said predetermined edge of said image is on the same side as said boundary area.

16. The printing control method as claimed in claim 14, further comprising:
    (e) calculating a shift amount of overall images for a plurality of pages printed on a sheet of paper based on the imposed image data from a center of said sheet of paper; and
    (f) adjusting a printing position of said imposed image data in order to reduce said shift amount.

17. A non-transitory computer readable recording medium stored with a printing control program, said program causing a computer to execute a process comprising:
    (a) receiving print data including drawing information of a document to be printed;
    (b) calculating a boundary area of images for a plurality of pages of said document to be printed on a sheet of paper based on said print data;
    (c) generating image data for each page with padding data added in a data area corresponding to an edge opposite to said boundary area of said image in such a way that said image data has a data size of an integral multiple of a specified block size, based on said drawing information; and (d) imposing said image data in such a way that said images for a plurality of pages will be printed on a sheet of paper.

18. The non-transitory computer readable recording medium as claimed in claim 17, wherein
said step (c) includes:
  (c1) generating basic image data with said padding data added in a data area corresponding to a predetermined edge of said image; and
  (c2) relocating said padding data into said data area corresponding to the edge opposite to said boundary area of said image, if said predetermined edge of said image is on the same side as said boundary area.

19. The non-transitory computer readable recording medium as claimed in claim 17, wherein
said process further comprising:
  (e) calculating a shift amount of overall images for a plurality of pages printed on a sheet of paper based on the imposed image data from a center of said sheet of paper; and
  (f) adjusting a printing position of said imposed image data in order to reduce said shift amount.

* * * * *